United States Patent [19]

Dahl et al.

[11] 3,757,372
[45] Sept. 11, 1973

[54] METHOD OF FORMING A NUT

[76] Inventors: Norman C. Dahl, 78 Irving Pl., New York, N.Y. 10003; Joseph A. Tabor, 100 Midland Ave., Port Chester, N.Y. 10574

[22] Filed: Feb. 3, 1972

[21] Appl. No.: 223,156

[52] U.S. Cl. .................................. 10/86 R, 85/62
[51] Int. Cl. ............................................ B21d 53/24
[58] Field of Search ..................... 10/86 R, 86 F; 85/9 R, 61, 62; 151/21 A

[56] References Cited
UNITED STATES PATENTS

| | | | |
|---|---|---|---|
| 1,183,556 | 5/1916 | Green | 151/21 A |
| 1,456,177 | 5/1923 | Crockett | 10/86 R |
| 2,285,080 | 6/1942 | Berge | 151/21 A |
| 3,066,568 | 12/1962 | Armour | 85/9 R |
| 3,431,812 | 3/1969 | Dahl | 85/62 |
| 3,474,701 | 10/1969 | Setzler | 85/62 |
| 3,667,339 | 6/1972 | Dame | 85/61 |

FOREIGN PATENTS OR APPLICATIONS

513,212    2/1955    Italy ................................. 10/86 R

*Primary Examiner*—Charles W. Lanham
*Assistant Examiner*—E. M. Combs
*Attorney*—Richard P. Crowley et al.

[57] ABSTRACT

A method is described for assembling a nut having an external groove on its wrenching surface from two separately formed parts. A first internally threaded part has an extending sleeve-like portion of reduced diameter. The second part has an internal cylindrical groove. The sleeve is pressed into the second part being received within the groove. The parts when assembled define an annular external groove on the wrenching surface of the sleeve. Separately forming the parts and then assembling eliminates machining the external groove and lowers the cost of the nut.

10 Claims, 4 Drawing Figures

PATENTED SEP 11 1973　　　　　　　　　　　　　　　3,757,372

METHOD OF FORMING A NUT

BACKGROUND OF THE INVENTION

Nuts have been developed which offer significant advantages over nuts presently used in commercial applications. U.S. Pat. No. 3,431,812, issued Mar. 11, 1969, hereby incorporated by reference in this application, is directed to a nut design which under all conditions will give an easily recognizable signal when a predetermined design axial load has been reached in the bolt on which the nut is tightened and which will produce a desirable distribution of bearing stress between the nut face and its abutting surface.

The aforementioned nut presently requires in its manufacture a groove in the hexagonal wrenching surface. This groove is presently formed by a machine tool cutting operation which adds to the cost of manufacture. Therefore, techniques to overcome any cost limitations on this nut design would be most advantageous.

SUMMARY OF THE INVENTION

The invention is directed to forming a nut, such as described in U.S. Pat. No. 3,431,812, wherein a plurality of parts, such as first and second parts, are separately formed and subsequently pressed together, the outer walls of said first and second parts defining an external groove in the outer wall of the final assembled nut thereby eliminating a machining operation in the formation of such a nut. A ring of flowable material can be positioned between the two parts so that the material is contained within the external groove when the two parts of the nut are pressed together. The invention therefore overcomes the difficulties of manufacturing nuts having grooved surfaces by providing a method of manufacture which eliminates or miminizes costly machining operations and thus makes available at low costs nuts of technically effective designs.

Our invention provides a method for forming a nut which includes forming a first part having an outer surface, such as a wrenching surface, the first part having an extension thereon, for example a sleeve-like portion, of a lesser diameter than the wrenching surface of the first part; forming a second part having an outer surface, such as a wrenching surface, and having a cylindrical groove disposed within said section; and joining said first and second parts to form a fastening member whereby the sleeve-like portion is received within the groove, the outer surfaces of the parts defining an annular groove on the outer surface of the fastening member, said groove extending radially inward and terminating at the outer surface of the sleeve-like portion.

Our invention in a preferred embodiment comprises a method for forming a nut which includes forming a first part, one section of which has an outer wrenching surface, a second section having a sleeve-like portion of a lesser diameter than the wrenching surface of the first section, said part having an inner surface which is threaded along a portion thereof and nonthreaded for the remainder of said surface; forming a second part having an outer wrenching surface and a nonthreaded inner surface and having a cylindrical groove disposed within said second part adjacent to said inner surface; and joining said first and second parts to form a fastening member whereby the sleeve-like portion is received within the groove, the outer surfaces of the parts defining an annular groove on the outer surface of the fastening member, said groove extending radially inward and terminating at the outer surface of the sleeve-like portion.

DESCRIPTION OF THE PREFERRED EMBODIMENT

Figure 1:
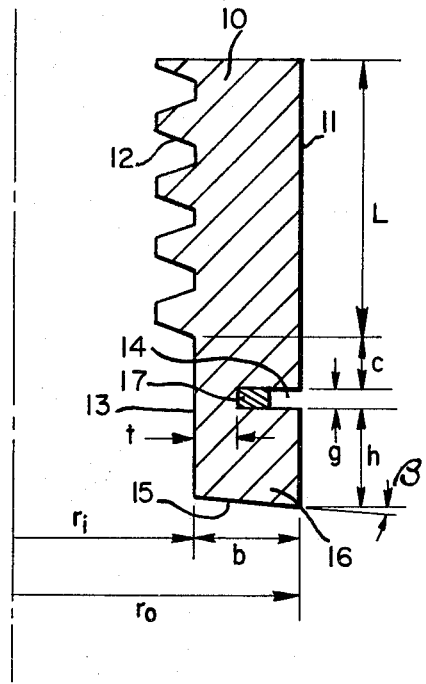
FIG. 1 is a sectional view of the preferred embodiment of a nut designed according to U.S. Pat. No. 3,431,812.

A nut designed according to U.S. Pat. No. 3,431,812 is shown in FIG. 1. The nut 10 has a hexagonal outer peripheral wrenching surface 11 and an upper internal threaded section 12 of length L and a lower internal cylindrical section 13 of radius $r_i$. At a distance C below the internal threaded section 12 there is formed in the outer peripheral wrenching surface 11 an external disc-shaped annular groove 14 of width g and inner radius $r_i + t$. A flowable incompressible material 17 partially fills the groove 14. The internal cylindrical section 13 extends for a distance h below the annular groove 14 to form a lower cylindrical section 16 which terminates in the face 15 which is a conical surface of cone angle $\beta$. The width g of the groove 14 is generally made some fraction of the radial thickness t of the material between the bottom of the external groove 14 and the cylindrical surface 13.

Figure 2:
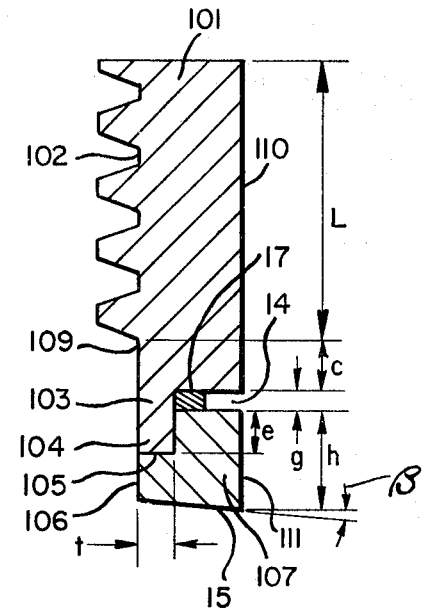
FIG. 2 is a sectional view illustrating how the nut of FIG. 1 is made of two parts according to our invention.

In FIG. 2 is shown a nut made according to the preferred embodiment of our invention. The nut has the same overall geometric configuration as the nut of FIG. 1 but is made of two parts, an upper part 101 and a lower part 107. The outer surfaces 110 and 111 of the upper and lower parts form a hexagonal outer wrenching surface. The upper part has an internal threaded section 102 and a nonthreaded section 109 from which extends a sleeve-like portion 103, the outer surface of the portion 103 being of a lesser diameter than the wrenching surface 110. The lower part 107 has a cylindrical groove 104 adjacent to the internal cylindrical surface 106 of axial depth e and of such diameter as to receive the sleeve-like portion 103 of the upper part 101. The sleeve 103 is made of axial length $g + e$ so that when the two parts are assembled they define an annular groove of width g which extends radially inward to the outer surface of the sleeve 103.

Figure 3:
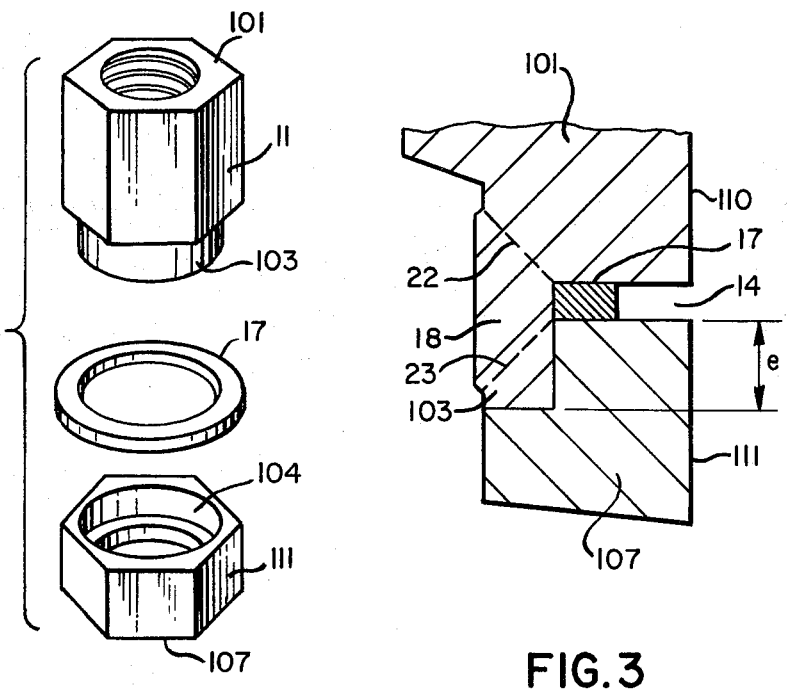
FIG. 3 is an enlarged sectional view of a portion of the nut of FIG. 2 after it has undergone plastic deformation.

In FIG. 3 is shown the mechanism of plastic deformation when the design bolt force is transmitted by the nut of FIG. 2. When the design force exists conical shear regions 22 and 23 develop and a wedge shaped yielding section 18 moves radially inward and this allows the external groove 14 to decrease in width. The reason the conical shear regions 22 and 23 develop is because the material outside of the sleeve 103 is very lowly stressed and provides restraint which prevents the yielding section 18 from moving radially outward and in turn causes the plastic deformation to be such that the conical shear regions develop so that yielding section 18 moves radially inward. In order to get the required constraint so that the yielding section moves radially inward, it is necessary to make e large enough, as shown in FIG. 3, so that the lower conical shear region 23 is contained in the sleeve 103 which extends downwardly into the cylindrical groove 104.

To assemble the nut the two parts as shown are separately formed, such as by forging, and subsequently pressed together to bear against each other on the line 105 and form a composite nut such as shown in FIG. 2. Although in the preferred embodiment the parts are separately formed by forging, it is understood that the parts may be formed by other methods, such as by casting, etc. Further, once the parts have been separately formed, the method of assembly in the preferred embodiment is through pressing. Of course, other methods will occur to those skilled in the art.

Figure 4:
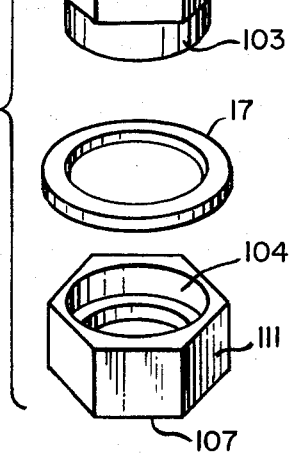
FIG. 4 is a telescopic exploded isometric view of the preferred embodiment of the invention.

As described, the external groove 14 in the above-referenced patent may be filled with an incompressible flowable material 17 which may or may not be electrically conducting in order that a visual indication may be provided when the groove is reduced in width and the material extrudes from the groove. Referring to FIG. 4, a flowable material 17 in the form of an annular ring may be positioned between the two parts so that the material is inserted in the external groove when the nut is assembled. The annular ring 17 may comprise a soft metal, such as aluminum, copper, brass, etc.

Our invention describes the formation of nuts having an external groove by forming separate parts of the nut and then assembling the parts so formed to form the composite nut thereby eliminating the high machining costs which are attendant with the nut when it is formed from one piece. Although described in reference to forming a nut from two parts, the nut may be formed from a plurality of parts. Further, the threaded section may have the groove and the nonthreaded section the sleeve-like portion. Conventional forging and/or casting techniques to form the composite may be used as well as conventional pressing or other techniques to form the composite nut assemblies.

Having described our invention, what we now claim is:

1. A method for forming a nut which comprises:
   a. forming a first part having an outer wrenching surface thereon, a sleeve-like portion extending from the first part, said sleeve-like portion being provided with an outer surface of a lesser diameter than the wrenching surface of the first part;
   b. forming a second part having an outer wrenching surface and an inner groove; and
   c. joining said first and second parts by inserting the sleeve-like portion of said first part into the groove of said second part, said first and second parts defining an annular external groove on the wrenching surface of the joined first and second parts, said groove extending radially inward and terminating at the outer surface of the sleeve-like portion of said first part whereby a composite nut is formed.

2. The method of claim 1 which includes forging said first and second parts.

3. The method of claim 1 which includes joining said parts by pressing said parts to form the fastening member.

4. The method of claim 1 which includes forming an internally threaded surface within said first part.

5. The method of claim 1 which includes forming an inner surface within said second part.

6. The method of claim 5 which includes forming a nonthreaded inner surface within said second part.

7. The method of claim 1 which includes forming the first part with an internally threaded surface and forming the second part with a nonthreaded internal surface.

8. The method of claim 1 which includes:
   inserting a ring-like flowable incompressible material between said parts prior to joining the first and second parts whereby when the first and second parts are joined the ring-like material is disposed in the annular external groove.

9. A method for forming a nut which comprises:
   a. forming a first part having first and second sections, the first section having an outer wrenching surface thereon and an internally threaded surface, the second section comprising a sleeve-like portion extending from the first section and having a smooth inner surface, said sleeve-like portion being provided with an outer surface of a lesser diameter than the wrenching surface of the first section;
   b. forming a second part having an outer wrenching surface and an internal cylindrical groove; and
   c. joining said first and second parts by inserting the sleeve-like portion of said first part into the groove of said second part, said first and second parts defining an annular external groove on the wrenching surface of the joined first and second parts, said groove extending radially inward and terminating at the outer surface of the sleeve-like portion of said first part whereby a composite nut is formed.

10. The method of claim 1 which includes forming the sleeve-like extension of the first part at least as long as its own radial thickness plus the axial width of the external annular groove.

* * * * *